United States Patent [19]

Masuda

[11] Patent Number: 4,875,059

[45] Date of Patent: Oct. 17, 1989

[54] WITH A LIQUID SUPPLY PATH HAVING DISPOSED THEREIN A FILLER PROVIDING PARTIAL FLOW BLOCKAGE THAT VARIES UPSTREAM OF THE DISCHARGE OREFICE

[75] Inventor: Kazuaki Masuda, Sagamihara, Japan

[73] Assignee: Canon Kabushiki Kaisha, Tokyo, Japan

[21] Appl. No.: 155,505

[22] Filed: Feb. 12, 1988

Related U.S. Application Data

[63] Continuation-in-part of Ser. No. 155,082, Feb. 11, 1988, abandoned.

[30] Foreign Application Priority Data

Feb. 13, 1987 [JP] Japan ............................ 62-029713

[51] Int. Cl.$^4$ ........................ B01D 15/16; B41J 3/04

[52] U.S. Cl. ........................ 346/140 R; 137/512.1; 417/540

[58] Field of Search ............... 346/140; 417/540, 566; 137/511, 512, 512.1

[56] References Cited

U.S. PATENT DOCUMENTS

| | | | |
|---|---|---|---|
| 3,320,971 | 5/1967 | Hemenway | 137/512.1 |
| 3,832,579 | 8/1974 | Arndt | 346/140 X |
| 4,278,983 | 7/1981 | Halasz | 346/140 |
| 4,306,245 | 12/1981 | Kasugayama et al. | 346/140 R |
| 4,514,742 | 4/1985 | Suga | 346/140 |
| 4,514,743 | 4/1985 | Roschlein | 346/140 |
| 4,719,479 | 1/1988 | Kyogoku | 346/140 |
| 4,723,129 | 2/1988 | Endo et al. | 346/1.1 |

FOREIGN PATENT DOCUMENTS 54-59936 5/1979 Japan .

*Primary Examiner*—Joseph W. Hartary

*Attorney, Agent, or Firm*—Fitzpatrick, Cella, Harper & Scinto

[57] ABSTRACT

An ink jet recording head has a liquid supply path communicating with a discharge port for discharging ink therethrough and energy generating means provided correspondingly to the liquid supply path and generating energy utilized to discharge the ink, charactrized in that the liquid supply path upstream of the energy generating means is filled with a filler, and an area in which the percentage of voids increases toward the upstream direction is provided in the upstream portion of the liquid supply path filled with the filler. In a preferred embodiment the filler comprises a plurality of glass balls having increasing diameters in the upstream direction. The use of such a filler increases the frequency response, droplet ejection speed and droplet diameter of the recording head.

15 Claims, 4 Drawing Sheets

WITH A LIQUID SUPPLY PATH HAVING DISPOSED THEREIN A FILLER PROVIDING PARTIAL FLOW BLOCKAGE THAT VARIES UPSTREAM OF THE DISCHARGE OREFICE

This application is a continuation-in-part of application Ser. No. 155,082, filed on Feb. 11, 1988, now abandoned.

BACKGROUND OF THE INVENTION

1. Field of the Invention

This invention generally relates to an ink jet recording head for effecting recording by discharging liquid called ink and an ink jet recording apparatus having such ink jet recording head, and more particularly to an ink jet recording head having high-speed responsiveness and excellent discharge stability and an ink jet recording apparatus having such ink jet recording head.

2. Related Background Art

There is known an ink jet recording method which effects recording by causing recording liquid to be discharged and fly. This method has excellent features in that high-speed printing is possible, that noise produced is low and the quality of recording is high and moreover color image recording is easy, and that recording can be done on plain paper or the like.

Such an ink jet recording method uses ink jet recording heads based on various liquid discharge principles to accomplish recording, and it is popular that as energy generating means generating energy utilized to discharge liquid, use is made of an electro-mechanical converting member or an electro-thermal converting member shown in Japanese Laid-Open Patent Application No. 59936/1979.

As an example of the ink jet recording method shown, for example, in Japanese Laid-Open Patent Application No. 59936/1979, there is a method whereby a pulse current is imparted to an elector-thermal converting member provided in a liquid path to cause a state change by heat to occur to recording liquid and the recording liquid is discharged from a discharge port on the basis of said state change to thereby accomplish recording. On whatever principle it may be based, to obtain a practical performance as a recording apparatus, it is required to be able to repetitively discharge the liquid with high-speed responsiveness of 1 KHz–10 KHz.

To cause such an ink jet recording head to repetitively discharge the liquid, the amount of liquid lost by the discharge must be supplemented by the time of next discharge. A typical method thereof is to utilize the surface tension of the liquid and direct the liquid to the discharge port by capillary phenomenon.

Accordingly, to drive the energy generating means at a high frequency to thereby accomplish high-speed recording, it is necessary to provide structure which readily permits the discharge port to be replenished with liquid, that is, structure in which the length of the liquid path is short and the cross-sectional area of the liquid path is great, that is, the liquid path resistance is small. However, if the liquid path resistance is made small, energy loss upstream of the liquid path occurs during the generation of the energy utilized to discharge the liquid, to hamper the effective contribution of said energy to the liquid discharge, and this has led to a slow discharge speed of the liquid or a small diameter of liquid droplets, which in turn has sometimes resulted in a low quality of recording. In other words, there has sometimes arisen the problem that an attempt to increase the drive frequency results in a slow discharge speed and an attempt to improve the discharge speed fails to increase the frequency from the necessity of increasing the liquid path resistance to thereby minimize the loss of energy, and with the conventional ink jet recording head, it has sometimes been the case that rapid and stable recording becomes difficult.

SUMMARY OF THE INVENTION

The present invention has been made in view of the above-noted problem peculiar to the prior art and an object thereof is to provide an ink jet recording head in which the energy loss during the generation of energy utilized to discharge liquid is small and the effective utilization of the energy during the discharge of the liquid is possible and liquid path resistance is small to enable quick supplementation of the recording liquid when the recording liquid is to be supplemented after the discharge of the liquid, and an ink jet recording apparatus having such ink jet recording head, or in other words, in ink jet recording head which can accomplish recording of high quality rapidly and stably and an ink jet recording apparatus having such ink jet recording head.

Another object of the present invention is to provide an ink jet recording head having a liquid supply path communicating with a discharge port for discharging ink therethrough, and energy generating means provided correspondingly to said liquid supply path and generating energy utilized to discharge the ink, characterized in that said liquid supply path upstream of said energy generating means is filled with a filler, and an area in which the percentage of voids increases toward the upstream direction is provided in the upstream portion of said liquid supply path filled with said filler.

DESCRIPTION OF THE PREFERRED EMBODIMENTS

In the present invention, a filler whose percentage of voids is greater toward the upstream direction is disposed on the upstream side of a liquid supply path with respect to energy generating means (the side opposite to the discharge port). As a result, the resistance to flow becomes greater when recording liquid flows in the direction opposite to a discharge port and the resistance becomes smaller when the recording liquid flows toward the discharge port, and therefore, the loss of energy which does not contribute to the discharge of the liquid is prevented by this filler and an improved discharge speed can be achieved and stable recording by quick supplementation of the recording liquid is possible.

Figure 1:
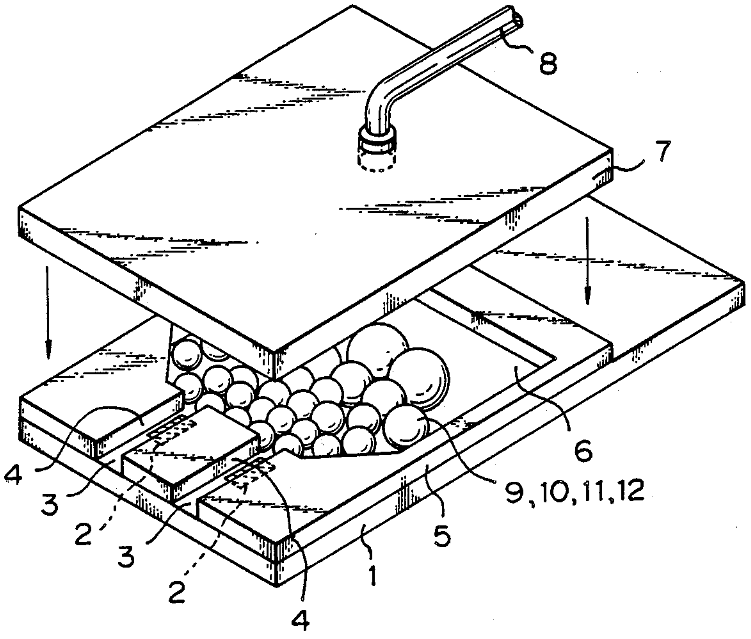
FIG. 1 is a schematic perspective view of an ink jet recording head according to an embodiment of the present invention.

Glass balls as shown in FIG. 1 may typically be mentioned as said filler, but neither the material thereof nor the shape thereof is restricted thereto. Such filler may be disposed, for example, upstream of the energy generating means, and the percentage of voids thereof may be continuously varied or intermittently varied.

The energy generating means may be well-known means such as means utilizing a variation in the state of recording liquid caused by the supply of heat to the recording liquid, like various heat generating members, or means utilizing a variation in the volume of the liquid path, like a piezoelectric element.

The present invention will hereinafter be described in detail with reference to the drawings. In the following, description will be made chiefly of an ink jet recording head having a plurality of discharge ports, but the present invention is also applicable to an ink jet recording head having a single discharge port.

Figure 2:
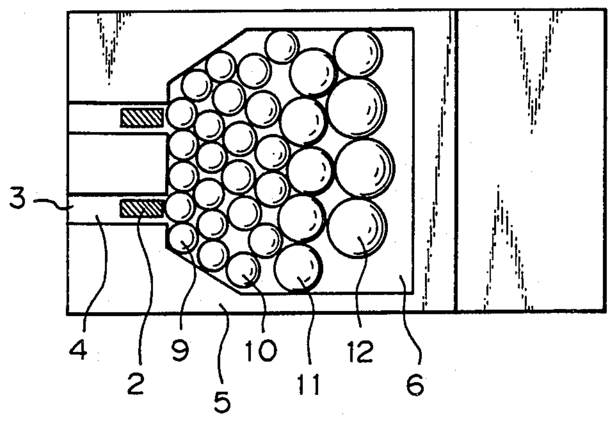
FIG. 2 is a schematic plan view of the ink jet recording head according to an embodiment of the present invention.

FIGS. 1 and 2 show an embodiment of the ink jet recording head of the present invention, FIG. 1 being a schematic perspective view of the head, and FIG. 2 being a schematic plan view of the head with a plate-like cover 7 removed therefrom.

In these figures, the reference numeral 1 designates a substrate formed of a desired material (in the present embodiment, silicon). A desired number of heat generating members 2 (two of which are shown for the convenience of illustration) as energy generating means are installed on the substrate 1. Although not shown, wiring for supplying an electrical signal is provided to the heat generating members 2.

The reference numeral 3 denotes discharge ports for discharging the recording liquid. In the present embodiment, the shape of the discharge ports is shown as a square shape and the size thereof is bout 40 μm×35 μm, but of course, the number and shape of the discharge ports may be as desired. The reference numeral 4 designates liquid paths communicating with the discharge ports 3, and the reference numeral 6 denotes a liquid chamber communicating with the plurality of liquid paths 4. In the present embodiment, the liquid supply path has the liquid paths 4 and the liquid chamber 6. In the present embodiment, the distance from each discharge pot 3 to the liquid chamber 6 is 300 μm. The reference numeral 5 designates a member for forming the discharge ports 3, the liquid paths 4 and the liquid chamber 6. This member 5 has been made by layering photosensitive resin on the substrate 1 and forming a pattern by the usually practised photolithography technique. The reference numeral 7 denotes a cover plate placed on the member 5. The cover plate 7 has connected thereto a supply pipe 8 for supplying the recording liquid from the outside to the liquid chamber 6.

The reference numerals 9, 10, 11 and 12 designate minute glass balls as an example of the filler called so in the present invention that partially block the liquid supply path in the chamber. These glass balls 9, 10, 11 and 12 have their diameters determined so that 9<10<11<12, and are disposed in the liquid chamber 6 in the named order so that the percentage of voids thereof (that is, the percentage of the flow area not occupied by the balls) is greater toward the upstream side. Each glass ball 9 is made slightly larger than the cross-sectional dimension of the liquid path 4 in order to prevent the glass balls 9 from flowing into the liquid paths 4. Further, in the present embodiment, these glass balls 9, 10, 11 and 12, before inserted into the liquid chamber 6, are subjected to sufficient washing by an interface activator, and thereafter subjected to the oxygen plasma treatment under the conditions of $O_2$ pressure of 1 mmHg, RF power of 100 W and treatment time of about 5 minutes to thereby make the surface thereof hydrophilic. Of course, the sized of these glass balls may be as desired, but in the present embodiment, the glass balls 9 have an average grain diameter of 60 μm±5%, the glass 100 μm±5%, and the glass balls 12 have an average grain diameter of 130 μm±5%.

The recording by the use of such ink jet recording head of the present invention can be carried out in a manner not differing from the prior art, and is effected, for example, by applying a voltage of a pulse width of the order of 10 μsec. to the energy generating means. The application of such a voltage causes the heat generating members on the substrate to generate heat, with a result that a change in state by the heat occurs to the recording liquid, and on the basis of such change in state, the recording liquid is discharged from the discharge ports 3 to thereby accomplish recording.

Figure 5:
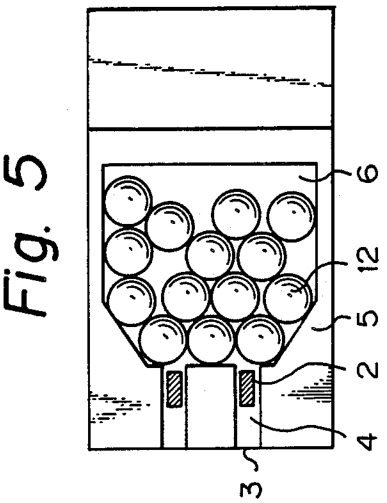
FIGS. 3 to 6 are schematic plan views of ink jet recording heads according to the prior arts and comparative examples.
Figure 6:
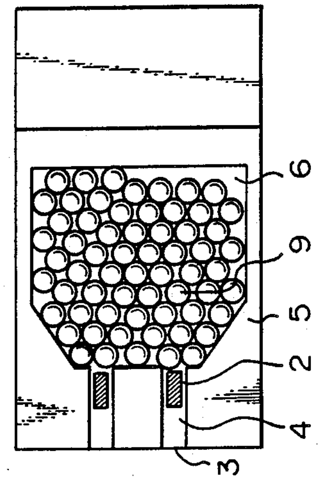
Figure 3:
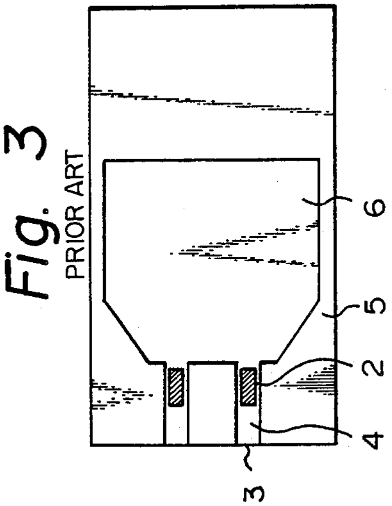
Fig. 3 PRIOR ART
Figure 4:
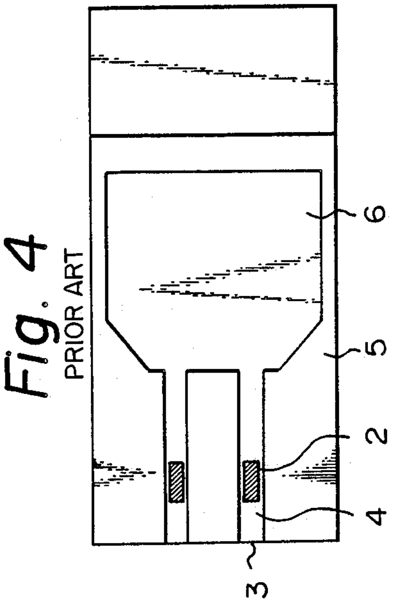
Fig. 4 PRIOR ART

The recording characteristics obtained by effecting recording by the use of the ink jet recording head of the above-described embodiment are shown in Table 1 below. Also in Table 1, there are shown the recording characteristics obtained by effecting recording by the use of the ink jet recording heads of the prior art shown in FIGS. 3 and 4, which have been made for comparison of performance with the ink jet recording head of the present embodiment, and the recording characteristics obtained by effecting recording by the use of the ink jet recording heads of the comparative examples shown in FIGS. 5 and 6, in which the percentage of voids of the filler has been made constant. In the following, the recording head of FIG. 3 is referred to as prior art 1, the recording head of FIG. 4 is referred to as prior art 2, the recording head of FIG. 5 is referred to as comparative example 1, and the recording head of FIG. 6 is referred to as comparative example 2.

Before the recording characteristics of the ink jet recording head of the present embodiment is described on the basis of Table 1, the constructions and recording characteristics of the ink jet recording heads of the prior art and the comparative examples shown in FIGS. 3 to 6 will first be described to make the description better understood. In these figures, there are shown plan views of the recording heads with a cover plate 7 similar to that of the above-described embodiment removed therefrom.

In these Figures, the reference numeral 2 designates heat generating members. The reference numeral 3 denotes discharge ports. Liquid paths 4 communicate with the discharge ports 3, and a liquid chamber 6 communicates with the liquid paths 4. The reference numeral 5 designates a member for forming the discharge ports 3, the liquid paths 4 and the liquid chamber 6. The member 6 is formed by patterning photosensitive resin as in the embodiment of the invention discussed above. The reference numerals 9 and 12 denote glass balls. As in such diameter of 60 μm±5% and the glass balls 12 have an average grain diameter of 130 μm±5%. Also, these glass balls have been subjected to surface washing treatment and hydrophilic treatment in the same manner as such embodiment.

The ink jet recording heads of the prior art and the comparative examples will now be individually described.

The recording head of prior art 1 shown in FIG. 3 is entirely similar in construction to the recording head of the embodiment with the exception that the glass balls in the liquid chamber are eliminated.

The recording head of prior art 2 shown in FIG. 4 is of a type in which the length from each heat generating member 2 to the liquid chamber 6 is extended, and the length of each liquid path 4 from each discharge port 3 to the liquid chamber 6 is twice as great as that in the above-discussed embodiment of the invention; and.

The recording heads of comparative examples 1 and 2 shown in FIGS. 5 and 6, respectively, are similar to the recording head of such embodiment with the exception that the size of the glass balls filling the liquid chamber is one kind and the percentage of voids of the filler is constant. Glass balls having an average grain diameter of 130 μm±5% are used in comparative example 1, and glass balls having an average grain diameter of 60 μm±5% are used in comparative example 2. That is, of the four kinds of glass balls used in the embodiment, the glass balls 12 largest in grain diameter are used in comparative example 1, and the glass balls 9 smallest in grain diameter are used in comparative example 2.

The recording characteristics of the ink jet recording heads of the prior art and the comparative examples will now be described on the basis of Table 1.

With the recording head of prior art 1, wherein the length of the liquid path is short, there was obtained a good frequency, i.e., a maximum repetition frequency of 7.1 KHz, but because of the short length of the liquid path, the energy loss to the liquid chamber side was great, and the speed of liquid droplet was slow, i.e., 3.5 m/s, as compared with that in the above discussed embodiment, and the discharged liquid droplet was small, i.e., 39 μm, as compared with that in such embodiment. Also, when a printing test was carried out at a drive frequency of 4 KHz by the use of plain paper, there were only obtained printed images of low quality in some cases.

With the recording head of prior art 2, wherein the length of the liquid path is greater than in the recording head of prior art 1, the speed of liquid droplet was 8.0 m/s and the diameter of liquid droplet was relatively good, i.e., 44 μm. This is presumably owing to the reduction in energy loss resulting from the greater length of the liquid path, but the greater length of the liquid path increased the liquid path resistance and therefore, much time was required for the replenishment of the recording liquid necessary from after one cycle of liquid discharge till the next cycle of liquid discharge, and the frequency was low, i.e., 1.9 KHz, as compared with that in the above-discussed embodiment of the invention. Also, with this recording head, good printing performance was obtained up to a low range of the drive frequency, i.e., about 2.0 KHz, but for a drive frequency of 2.3 KHz or more, satellites, splash and the like occurred in some cases and the diameter of liquid droplet was not stable, thus resulting in a very low quality of printing in some cases. This seems to be due to the fact that before the recording liquid was completely supplemented after one cycle of discharge, the next cycle of discharge took place and the size of the discharged liquid droplet was not stable.

Next, as regards the recording heads of the comparative examples, with the recording head of comparative example 1, wherein glass balls of the same grain diameter are loaded, a good frequency of 4.9 KHz was obtained, but the speed of liquid droplet was at a low level, i.e., 6.5 m/s, as compared with that in the embodiment. That is, in this recording head, glass balls of a large grain diameter are loaded and therefore, the voids providing the paths for the recording liquid are relatively large to enable the supplementation of the recording liquid to be relatively easily accomplished, but the effect of suppressing the energy loss to the liquid chamber side is not sufficient, and this seems to have caused the speed of liquid droplet to assume a low level as compared with that in the embodiment. Also, the printing performance was relatively good even for a drive frequency of 4 KHz, but the low speed of liquid droplet led to the irregularity of the shooting position of the recording liquid onto the recording paper in some cases.

In the recording head of comparative example 2, wherein glass balls of a smaller grain diameter than those of the recording head of comparative example 1 are loaded, the voids providing the paths for the recording liquid were small and the liquid path resistance increased and therefore, the energy loss was small and the speed of liquid droplet was as high as 10.3 m/s, but much time was required for the supplementation of the recording liquid and the frequency was low, i.e., 2.7 KHz, as compared with that in the embodiment. Further, when printing was carried out at a drive frequency of 4 KHz, satellites and splash which reduced the printing performance occurred in some cases.

In contrast, with the recording head of the present embodiment of the invention in which the diameter of the glass balls was varied, there were obtained good recording characteristics. That is, the speed of liquid droplet and the frequency both were good, i.e., 9.8 m/s and 4.8 KHz, respectively, and the diameter of liquid droplet was also satisfactory, i.e., 43 μm.

In the recording head of this embodiment, it is supposed that the energy loss to the liquid chamber side during the liquid discharge could be prevented by disposing glass balls of a small diameter, i.e., of a small percentage of voids, upstream of the heat generating members, and that as regards the supplementation of the recording liquid after the termination of the discharge, glass balls of gradually larger diameters were disposed from the heat generating member side toward the liquid chamber side, whereby the percentage of voids was increased, for example, stepwise, and thereby the liquid path resistance could be reduced to shorten the time required for the supplementation of the recording liquid. Also, this recording head was very good in its printing performance, and when a printed matter obtained at a drive frequency of 4 KHz was observed by means of a microscope, there was found little or no deviation or distortion of dots. Further, the printed matter thus obtained comprised large diameter dots and was dark in the printing

TABLE 1

| | Speed of droplet (m/s) | Frequency (KHz) | Diameter of discharged droplet (μm) | Quality of printing when this head was driven at 4 KHz |
|---|---|---|---|---|
| Embodiment | 9.8 | 4.8 | 43 | |
| Prior Art 1 | 3.5 | 7.1 | 39 | Δ |
| Prior Art 2 | 8.0 | 1.9 | 44 | X |
| Comp. Ex. 1 | 6.5 | 4.9 | 41 | |

TABLE 1-continued

| | Speed of droplet (m/s) | Frequency (KHz) | Diameter of discharged droplet (μm) | Quality of printing when this head was driven at 4 KHz |
|---|---|---|---|---|
| Comp. Ex. 2 | 10.3 | 2.7 | 45 | Δ |

Evaluation standard:
: excellent
: good
Δ: somewhat bad
X: bad

In the present invention, the discharge ports need not always be formed so that as shown in FIG. 1, the ink is discharged in a direction substantially parallel to the direction in which the ink is supplied in the liquid supply path. For example, the discharge ports may be formed so that the ink is discharged in a direction substantially perpendicular to the direction in which the ink is supplied in the liquid supply path.

The ink jet recording head according to the invention is not limited to the above-stated embodiment. For example, in case of using the balls of the same diameter, the balls may be arranged in such a manner that the percentage of the voids between the balls continuously or intermittently increasing toward the upstream of the supply path.

Figure 7:
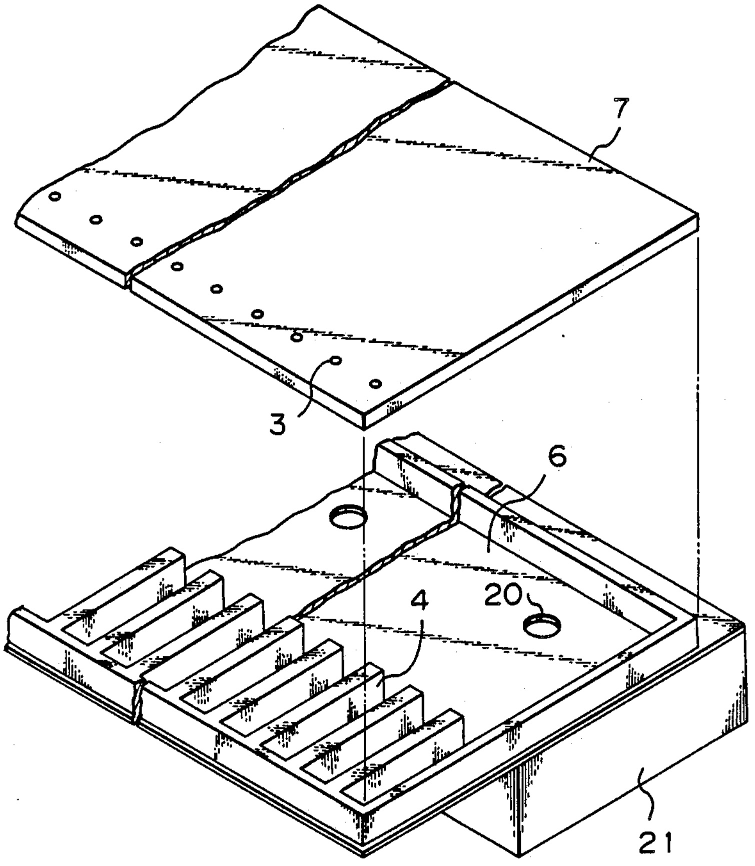
FIG. 7 is a schematic perspective view showing another embodiment of the ink jet recording head to which the present invention is applicable.

FIG. 7 is a schematic perspective view showing an example of such a form of ink jet recording head. In the liquid chamber 6 of the ink jet recording head of FIG. 7, a filler is loaded so that as previously described, the percentage of voids thereof varies, that is, the percentage of voids becomes greater toward ink supply ports 20, whereby there is provided an ink jet recording head according to another embodiment of the present invention. In FIG. 7, heat generating members as energy generating means are disposed along liquid paths 4 substantially just beneath discharge ports 3. The reference numeral 7 designates a cover plate having the discharge ports 3, and the reference numeral 21 denotes an ink reservoir communicating with the liquid chamber 6 through the ink supply ports 20.

Figure 8:
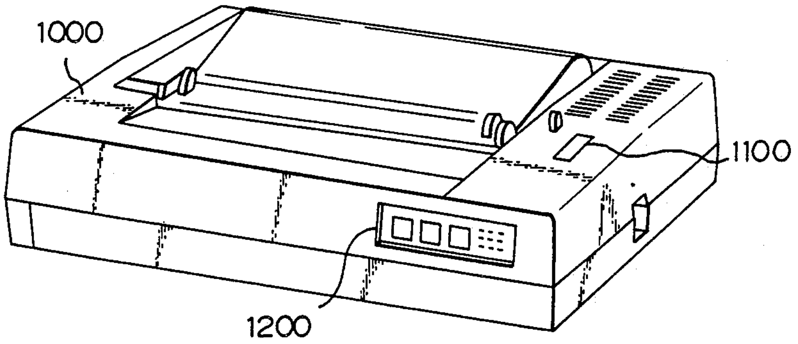
FIG. 8 is a schematic perspective view of an ink jet recording apparatus according to the present invention.

FIG. 8 is a schematic perspective view showing an example of the ink jet recording apparatus of the present invention having the ink jet recording head of the present invention. In FIG. 8, the reference numeral 1000 designates the apparatus body, the reference numeral 1100 denotes a main switch, and the reference numeral 1200 designates an operating panel.

Although not particularly described in the foregoing, in the recording head of the above-described embodiment, the loaded glass balls prevent the entry of dust or foreign materials into the liquid paths or the discharge ports, and this leads to the obtainment of the secondary effect of eliminating the clogging of the recording head caused by the dust or foreign materials.

According to the present invention, as described above, there can be economically provided an ink jet recording head which is capable of accomplishing recording of high quality rapidly and stably and an ink jet recording apparatus having such ink jet recording head.

I claim:

1. An ink jet recording head having:

a liquid supply path communicating with a discharge port for providing for ink for discharge through said discharge port, energy generating means provided correspondingly to said liquid supply path for generating energy to discharge the ink, and a filler disposed in said liquid supply path upstream of said energy generating means and partially blocking said liquid supply path so as to define a flow path having a varying percentage of voids, wherein said percentage of voids increases in the upstream direction of said liquid supply path.

2. An ink jet recording head according to claim 1, wherein said liquid supply path includes a liquid path leading directly to said discharge port.

3. An ink jet recording head according to claim 2, wherein said liquid supply path includes a liquid chamber communicating with said liquid path.

4. An ink jet recording head according to claim 1, further comprising a plurality of said discharge ports.

5. An ink jet recording head according to claim 1, further comprising a plurality of said discharge ports, wherein said liquid supply path includes a liquid chamber communicating with said plurality of discharge ports.

6. An ink jet recording head according to claim 1, wherein said discharge port is formed so that the ink is discharged in a direction substantially parallel to the direction in which the ink is supplied in said liquid supply path.

7. An ink jet recording head according to claim 1, wherein said discharge port is formed so that the ink is discharged in a direction substantially perpendicular to the direction in which the ink is supplied in said liquid supply path.

8. An ink jet recording head according to claim 1, wherein said energy generating means includes an electro-thermal converting member for generating thermal energy.

9. An ink jet recording head according to claim 1, wherein said energy generating means includes an electro-mechanical converting member.

10. An ink jet recording head according to claim 1, wherein said filler includes a plurality of glass balls.

11. An ink jet recording head according to claim 1, wherein the surface of said filler is subjected to hydrophilic treatment.

12. An ink jet recording head according to claim 11, wherein said hydrophilic treatment is oxygen plasma treatment.

13. An ink jet recording head according to claim 1, wherein said percentage of voids varies continuously.

14. An ink jet recording head according to claim 1, wherein said percentage of voids varies intermittently.

15. An ink jet recording apparatus comprising the ink jet recording head of claim 1 and a main power source switch.

* * * * *

UNITED STATES PATENT AND TRADEMARK OFFICE
CERTIFICATE OF CORRECTION

PATENT NO. : 4,875,059

DATED : October 17, 1989

INVENTOR(S) : KAZUAKI MASUDA

It is certified that error appears in the above-identified patent and that said Letters Patent is hereby corrected as shown below:

COLUMN 1

Lines 2-5, Change the title to read as follows:
--INK JET RECORDING HEAD WITH A LIQUID SUPPLY PATH HAVING DISPOSED THEREIN A FILLER PROVIDING PARTIAL FLOW BLOCKAGE THAT VARIES UPSTREAM OF THE DISCHARGE ORIFICE--.

Line 39, "elector-thermal" should read --electro-thermal--.

Line 51, "of next" should read --of the next--.

COLUMN 2

Line 68, "and stable" should read --and also, after the discharge of the liquid, high-speed stable--.

COLUMN 3

Line 37, "bout" should read --about--.

Line 46, "pot 3" should read --port 3--.

UNITED STATES PATENT AND TRADEMARK OFFICE
CERTIFICATE OF CORRECTION

PATENT NO. : 4,875,059

DATED : October 17, 1989

INVENTOR(S) : KAZUAKI MASUDA

It is certified that error appears in the above-identified patent and that said Letters Patent is hereby corrected as shown below:

COLUMN 4

Line 1, "inserted" should read --being inserted--.
Line 7, "sized" should read --sizes--.
Line 10, "glass 100 μm±5%," should read --glass balls 10 have an average grain diameter of 80 μm±5%, the glass balls 11 have an average grain diameter of 100 μm±5%,--.
Line 42, "is" should read --are--.
Line 58, "member 6" should read --chamber 6--.
Line 61, "such diameter" should read --such embodiment, the glass balls 9 have an average grain diameter--.

COLUMN 5

Line 10, "invention; and." should read --invention.--.

COLUMN 6

Line 57, "the printing" should read --printing concentration and pleasing in appearance. Furthermore, such a printed state was substantially similar even for a higher frequency of 5 KHz.--.

Table 1, "this" should read --the-- and

"4 KHz<br>△<br>X" should read --4 KHz<br>◎<br>△<br>X<br>O--.

UNITED STATES PATENT AND TRADEMARK OFFICE
CERTIFICATE OF CORRECTION

PATENT NO. : 4,875,059
DATED : October 17, 1989
INVENTOR(S) : KAZUAKI MASUDA

It is certified that error appears in the above-identified patent and that said Letters Patent is hereby corrected as shown below:

COLUMN 7

Table 1-continued, "this" should read --the-- and
"Evaluation standard:
:excellent
:good"
should read --Evaluation standard
◎:excellent
○:good--.

Line 26, "balls continuously" should read --balls is continuously--.

COLUMN 8

Line 6, "providing for" should read --providing--.

Signed and Sealed this

Sixteenth Day of April, 1991

Attest:

HARRY F. MANBECK, JR.

Attesting Officer

Commissioner of Patents and Trademarks